Nov. 2, 1965   B. L. GOEPFERT ETAL   3,214,921
PIPE LAYING APPARATUS
Filed Dec. 7, 1961
2 Sheets-Sheet 1
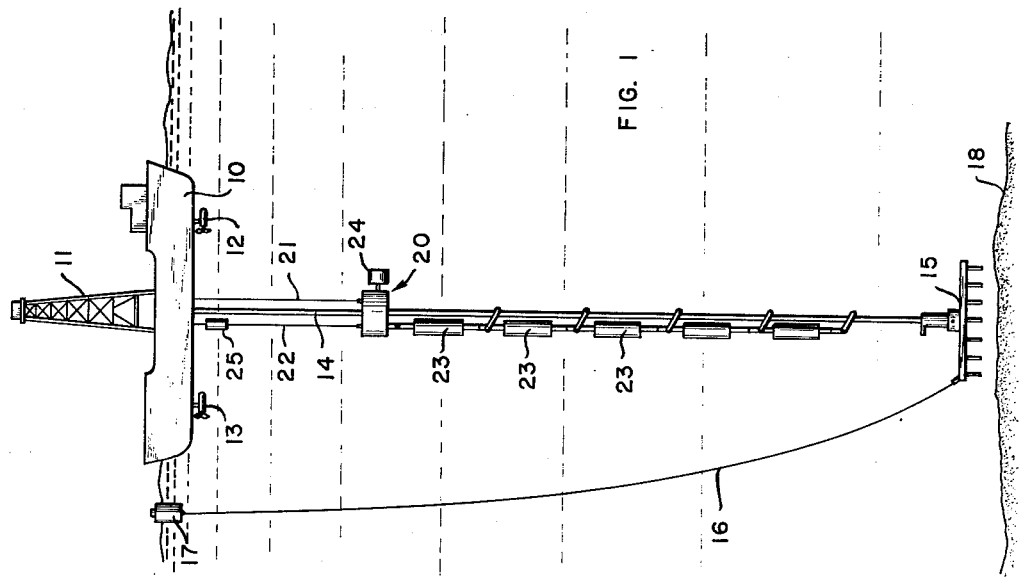
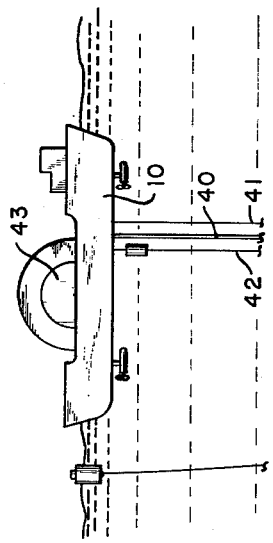
INVENTORS:
B. L. GOEPFERT
W. J. HAYES
T. W. G. RICHARDSON, JR.
H. L. SHATTO, JR.
BY:
THEIR ATTORNEY

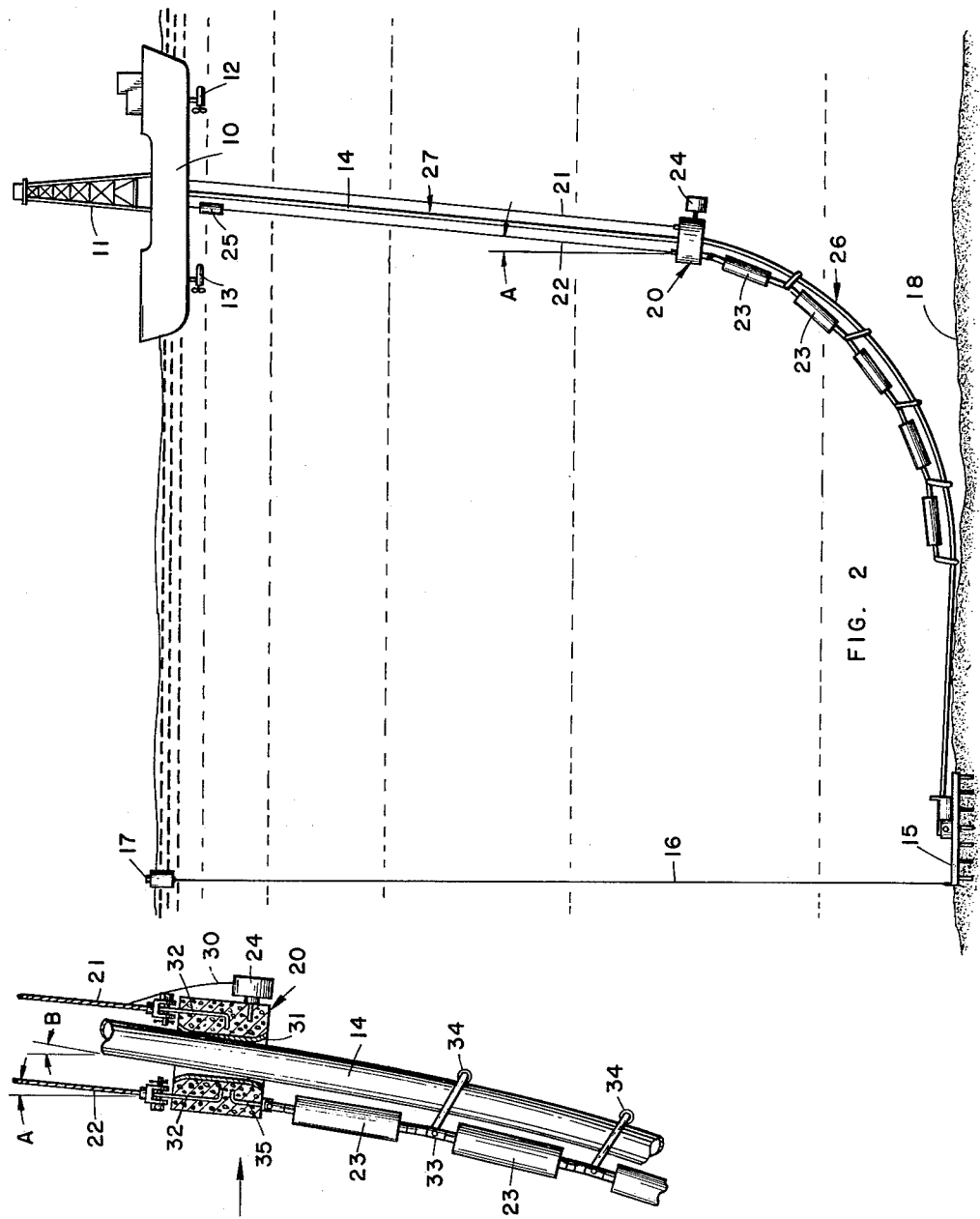

United States Patent Office 3,214,921
Patented Nov. 2, 1965

3,214,921
PIPE LAYING APPARATUS
Benjamin L. Goepfert, West Covina, William J. Hayes, Torrance, Thomas W. G. Richardson, Jr., Los Angeles, and Howard L. Shatto, Jr., Palos Verdes, Calif., assignors to Shell Oil Company, New York, N.Y., a corporation of Delaware
Filed Dec. 7, 1961, Ser. No. 157,679
5 Claims. (Cl. 61—72.3)

This invention pertains to pipe laying apparatus and more particularly to a system for continuously laying a pipe line in deep offshore waters.

In laying pipe lines in deep offshore waters, for example waters more than 100 feet in depth, the pipe line must be lowered to the bottom without kinking the pipe line or buckling it. In addition, the bend of the pipe line must be maintained within the stress limit of the pipe. In order to maintain the bending within the stress limit the pipe line must be lowered using a large radius of bending. In the past, various systems have been devised for accomplishing the lowering operation. The normal procedure has been to use a guide means as the pipe is lowered off the pipe laying barge or other floating vessel in order to control the initial bend of the pipe. The pipe is then supported by buoyancy devices as it leaves the barge in order to maintain the bending radius within acceptable limits. While these systems have operated with a certain degree of efficiency, they have necessitated a start and stop type of operation as new sections of pipe were added to the pipe string and then the vessel moved forward to lower the new section to the bottom. In addition, the buoyancy means had to be moved as the pipe was lowered and this caused additional problems.

Even with these prior systems one was not sure that the bending of the pipe was maintained within acceptable limits since no attempt was made to measure or control the bend. The systems depended purely upon the support of the buoyancy members and the weight of the pipe to control the bending.

A still further problem arose in that the vessel or floating barge from which the pipe line was lowered would move over large areas and cause undue stress on the pipe and result in the pipe line being laid in the wrong position or location.

Accordingly, it is the principal object of this invention to provide a system for automatically laying a pipe line in a deep water offshore area having means for controlling the bend radius of the pipe line and automatically positioning the pipe laying vessel as additional sections of the pipe line are made up and lowered.

A still further object of this invention is to provide an automatic pipe laying system in which the pipe line is supported by buoyant members to limit the bend radius, and the forward tilt of the pipe line adjacent the buoyancy members is measured to accurately control the bend radius of the pipe.

A still further object is to provide an automatic pipe laying system in which a guide weight is used to provide a forward thrust on the pipe string and thus assist in controlling the bend radius of the pipe with the guide weight being disposed at a predetermined depth in the water.

The above objects and advantages of this invention are achieved by providing a floating vessel having an essentially upright derrick or crane means for lowering the pipe string as additional sections are added. The vessel is provided with at least two separate propulsion units that have means for controlling their thrust and direction of thrust. The pipe string is provided at its lower end with a suitable landing base and a plurailty of interconnected buoyancy chambers. The uppermost buoyancy chamber is connected to a guide weight that surrounds the pipe string. The guide weight in turn is connected to the floating vessel by a plurality of guide lines or a tubular guide member. A measuring device, for example a tiltmeter, is disposed to measure the displacement angle of one or more of the guide lines or tubular guide member that support the guide weight. In addition, means are provided for accurately controlling the depth of the guide weight in the water.

When a pipe line is to be laid it is first lowered vertically from the floating vessel until the landing platform is near the bottom of the body of water. The plurality of interconnected buoyancy chambers are then lowered over the pipe string with the guide weight being attached to the uppermost buoyancy chamber. The vessel then lowers the pipe string to the bottom and moves off in the direction in which the pipe line is to be laid. As the vessel moves, the pipe line will assume a bend radius depending upon the number of buoyant members and the depth at which the guide weight is maintained. The guide weight will apply a thrust to the pipe string in the direction in which the vessel has moved an in addition act to maintain the pipe string in a position directly below the vessel in the athwartships direction. The angular displacement of the guide lines from the vertical is then measured and used to control the movement of the vessel. By maintaining the angular displacement approximately constant one can accurately control the bend radius of the pipe string as additional sections are added and lowered.

The above objects and advantages of this invention will be more easily understood from the following detailed description when taken in conjuncation with the attached drawings, in which:

FIGURE 1 illustrates the system of this invention with the pipe string being lowered vertically;

FIGURE 2 illustrates the system after the landing platform has been placed on the bottom and the vessel moved away in the direction in which the line is to be laid;

FIGURE 3 illustrates the detailed construction of the guide weight and the attachment of the buoyant members thereto; and FIGURE 4 illustrates the system as applied to smaller size pipe that may be conveniently stored on a large reel or the like.

Referring now to FIGURE 1, there is shown a floating vessel 10 which is provided with an essentially upright derrick 11. While a derrick is shown, obviously a mast or other lifting means could also be used. The vessel is provided with two propulsion units 12 and 13 located in the bow and stern thereof. These propulsion units are preferably of the type in which the magnitude of the thrust as well as its direction may be varied. The propulsion units may be in effect large outboard type devices that are rotatable or alternatively, Voith-Schneider propellers which vary propeller thrust through 360°. In addition, the vessel 10 should be provided with a propulsion unit controlling means that accepts information such as the ships heading as well as the tilt of the pipe string being laid as will be explained below and then provides appropriate signals to control the thrust and direction of thrust of each of the propulsion units. A suitable ship control system is disclosed and claimed in the copending application of H. L. Shatto, Jr. and J. R. Dozier, entitled "Ship Control System," Serial No. 95,601, filed March 14, 1961, now Patent No. 3,187,704. The pipe string 14 extends vertically through an opening in the hull of the vessel 10 directly under the derrick 11. The pipe string is provided with a suitable landing platform 15 at its lower end which is adapted to engage the bottom 18 of the body of water and securely anchor one end of the pipe string. A line 16 is attached to the landing platform 15 and provided with a marking buoy 17 at its other end to provide a means by which the anchored end of the pipe string may be readily located. As the pipe string is lowered a plurality of buoyancy chambers 23 are secured to one another to form a long string and lowered over the pipe as shown in FIGURE 1. The buoyancy chambers should have their buoyancy properly adjusted to support the pipe string and prevent it from assuming too sharp a radius as will be explained below. The use of a plurality of connected buoyancy chambers for lowering a pipe string is more particularly decribed and claimed in a copending application of L. G. Otteman, entitled "Offshore Pipe Laying Apparatus," Serial No. 68,843, filed November 14, 1960, now abandoned.

The uppermost buoyancy chamber 23 is secured to a guide weight means 20. The construction of the guide weight 20 and its use are more particularly described below with reference to FIGURES 2 and 3. The guide weight is suspended or supported from the bottom of the vessel 10 by a plurality of guide lines 21 and 22. In place of the guide lines 21 and 22, one may use a single tubular member that surrounds the pipe string. At least one of the guide lines has a tiltmeter means 25 disposed therein. The tiltmeter means is designed to measure the angular deflection from vertical of the guide line in two planes at an angle to each other. The two planes are preferably at right angles to each other and in addition aligned with or at least oriented in a known relationship to the longitudinal and athwartships axes of the vessel 10. The construction and use of the tiltmeter is more particularly described and claimed in the copending application of K. W. Foster, Serial No. 830,604, filed July 30, 1959, now Patent No. 3,121,954, entitled "Position Locating Device." A depth meter 24 or other device capable of sensing the depth at which the guide weight 20 is submerged is attached to the guide weight 20 and coupled to the control circuits on the vessel 10 by circuit means not shown.

In place of the depth meter 24 on the guide weight 20 measuring sheaves could be used to measure the length of guide lines used in supporting the guide weight 20. Likewise, other means could be used in place of the depth meter 24.

Referring now to FIGURE 2, the system of FIGURE 1 is shown with the vessel 10 being moved laterally away from the position in which the pipe string was vertically lowered. The pipe string has been lowered sufficiently to cause the landing platform to engage the bottom 18, thus firmly anchoring one end of the pipe string. After one end of the string is anchored the vessel 10 moves away and the portion 26 of the pipe string bends and assumes a certain radius of bending determined by the placement and buoyancy of the buoyancy chambers 23. Obviously, by using more chambers and chambers having greater buoyancy, the radius of the bend can be increased while the opposite effect would be obtained by using fewer buoyancy chambers or chambers having less buoyancy. The radius of bending used will, of course, be determined by the size of the pipe, its physical characteristics, and the material from which it is made. Given this information, one can easily determine the minimum bending radius which the pipe string can be subject to without failure or permanent deformation, then the buoyancy chambers can be adjusted to assure that the pipe string does not exceed this minimum bending radius. In special cases where the natural buoyancy and the flexibility of the pipe permit, the buoyancy chambers may be omitted.

The portion 27 of the pipe string which extends between the vessel 10 and the guide weight 20 is shown inclined at an angle to the vertical. The bend radius of the pipe string and the resulting stress in the pipe string are directly related to this angle that is substantially equal to the angle A between the guide line 22 and the vertical. Thus, if one could maintain the angle A constant one would maintain a substantially constant angle between the portion 27 of the pipe string and the vertical and a constant stress in the pipe string.

The angle A is chosen so as to minimize the stress placed on pipe string resulting from the bending from the horizontal to a vertical position. In addition, this angle is maintained constant so that the pipe string maintains a substantially constant radius of bending in the portions 26. To maintain the angle A constant, two things are required. First, that the guide weight 20 is used to provide a uniform forward thrust to the pipe string and the vessel 10 positioned with relation to the guide weight 20 to maintain the constant angle. In order to properly position the guide weight 20, the depth meter 24 is provided. By maintaining the guide weight 20 a predetermined depth from the bottom 18 of the body of water and by maintaining angle A constant, one will obtain a constant forward loading on the pipe string 14. To maintain the angle A constant the tiltmeter 25 is used to measure the angle. The signal from the tiltmeter 25 is used to control the propulsion controls of the vessel 10 to move it in the required direction to maintain angle A constant. The above-referenced copending application, Serial No. 95,601 to H. L. Shatto, Jr. and J. R. Dozier describes a propulsion control system which will accept an electrical signal indicating the magnitude of the angle A and adjust the propulsion means to maintain the measured value of the angle at any predetermined level.

Referring now to FIGURE 3, there is shown the construction details of the guide weight 20 and the buoyancy chambers 23. The guide weight 20 is preferably formed of a dense material such as cast concrete or cast metal such as iron or lead. The central opening in the guide weight is provided with a liner or sleeve member 31. The guide lines 21 and 22 are anchored to the guide weight as by use of hook end members 32 that are embedded in the guide weight. The buoyancy members are attached to the other end of the guide weight by similar hook-shaped members 35 also embedded in the guide weight. The buoyancy chambers are connected to each other by universal joint type of connectors 33 in order that they may have complete freedom of movement. In addition, each connection between the buoyancy members is provided with a support member having a roller 34 to support the pipe string 14. As explained above, the construction details of the buoyancy chambers and their use is more particularly described in patent application, Serial No. 68,843.

Referring to FIGURE 4, there is shown a partial view of the vessel 10 similar to that shown in FIGURE 1. In FIGURE 4, the pipe string 40 is carried coiled on a large drum 43 mounted on vessel 10. This is, of course, only feasible where a small diameter pipe is used since the minimum bending radius of the pipe increases rapidly with size. The remainder of the structure of laying pipe from the reel 43 is the same as that shown in FIGURE 1 and will not be described again.

From the above description, it can be readily appreciated that this invention has provided a simple system by which an underwater pipe line may be laid from a moving vessel. The vessel is moved in accordance with the bend of the pipe line to maintain this bend at a predetermined radius. As additional pipe is made up and lowered from the floating vessel the vessel will automatically move forward an amount to maintain the bend at the proper angle.

While the pipe string is being laid, longitudinal vessel position is preferably on automatic control with measurement by the longitudinal tiltmeter potentiometer, while lateral position can be on manual control with measurement by visual reference or Shoran. The heading of the vessel is preferable on automatic control with measurement by gyrocompass. The particular method and apparatus for obtaining these various methods of control are fully explained in patent application, Serial No. 95,601.

We claim as our invention:

1. A method for laying a pipe line from a floating vessel on the floor of a body of water, said method comprising: positioning the floating vessel over the location where one end of the pipe line is to be located; lowering vertically from the vessel a pipe string of sufficient length to substantially reach the floor of the body of water; attaching to the lowered string of pipe a plurality of buoyancy chambers, said buoyancy chambers being slidably attached at spaced intervals along the lowered string of pipe, said buoyancy chambers also including a guide weight adjacent the uppermost buoyancy chamber, lowering the pipe until the lower end engages the floor of the body of water, moving the vessel away from said location in the direction in which said pipe line is to be laid while maintaining the lower terminal end of said pipe in engagement with said floor; attaching additional pipe to the upper end of said string and lowering said guide weight as said vessel moves until said guide weight is a predetermined distance above the floor; maintaining said guide weight at a predetermined distance off the floor and said string adjacent said guide weight at a predetermined angle with the vertical and inclined in the direction in which the pipeline is being laid as said vessel moves along the direction in which said pipe line is being laid.

2. A method of laying a pipe line from a floating vessel on the floor of a body of water, said method comprising: positioning the floating vessel over the location where one end of the pipe line is to be located; lowering vertically from the vessel a pipe string of sufficient length to substantially reach the floor of the body of water; attaching to the lowered section of pipe a plurality of buoyancy chambers, said buoyancy chambers being slidably attached at spaced intervals along the lowered string of pipe, said buoyancy chambers also including a guide weight adjacent the uppermost buoyancy chamber, lowering the pipe until the lower end contacts the floor of the body of water, moving the vessel away from said location in the direction in which said pipe line is to be laid while maintaining the lower terminal end of said pipe in engagement with said floor; attaching additional pipe to the upper end of said string and lowering said guide weight to a predetermined distance above the floor and controlling the movement of said vessel to maintain said guide weight at a predetermined angle with the vertical and inclined in the direction in which said pipeline is being laid as said vessel moves along the direction in which said pipe line is being laid, and controlling the position of said vessel to maintain said angle within predetermined limits.

3. A method of laying a pipe line from a floating vessel on the floor of a body of water, said method comprising: positioning the floating vessel over the location where one end of the pipe line is to be located; lowering vertically a pipe string of sufficient length to substantially reach the floor of the body of water; attaching to the lowered section of pipe a plurality of interconnected buoyancy chambers, said buoyancy chambers being slidably attached at spaced intervals along said lowered section of pipe, attaching a guide weight to the uppermost buoyance chamber; moving the vessel away from said location in the direction in which said pipe line is to be laid while maintaining the lower terminal end of said pipe in engagement with said floor; attaching additional pipe to the upper end of said string and lowering said guide weight as said vessel moves until said guide weight is a predetermined distance above the floor; maintaining said guide weight at a predetermined distance off the floor; detecting the angular deflection with the vertical of the portion of the pipe string between said vessel and said guide weight; utilizing said detected angular deflection to control the movement of the vessel to maintain said angular deflection with preset limits and to incline said pipe in the direction in which the pipeline is being laid.

4. A method for laying a pipe line from a floating vessel on the floor of a body of water, said method comprising:
positioning the floating vessel over the location where one end of the pipe line is to be located;
lowering vertically a pipe string of sufficient length to substantially reach the floor of the body of water;
attaching to the lowered pipe string a plurality of buoyancy chambers along the length of the lowered pipe string in a slidable manner including a guide weight adjacent the uppermost buoyancy chamber;
lowering the pipe until the lower end engages the floor of the body of water moving the vessel away from said location in the direction in which said pipe line is to be laid while maintaining the lower terminal end of the pipe in engagement with the floor;
continuing to supply pipe to the upper end of said pipe string and lowering said guide weight to a predetermined distance above the floor as said vessel moves;
maintaining said guide weight at said predetermined distance off the floor and maintaining said pipe string between said guide weight and said vessel at a predetermined angle with the vertical and inclined in the direction said pipe line is being laid as said vessel moves along the direction in which said pipe line is being laid.

5. A method for laying a pipe line from a floating vessel on the floor of a body of water, said pipe being stored on said vessel in a coiled form, said method comprising:
positioning the floating vessel over the location where one end of the pipe line is to be located;
lowering vertically a sufficient length of the pipe to substantially reach the floor of the body of water;
attaching to the lower section of the pipe a plurality of buoyancy chambers, said buoyancy chambers being slidably attached at spaced intervals along the lowered section of pipe, said buoyancy chambers also including a guide weight adjacent the uppermost buoyancy chamber;
lowering the pipe until the lower end engages the floor of the body of water;
moving the vessel away from said location in the direction in which said pipe line is to be laid while maintaining the lowered terminal end of the pipe in engagement with the floor;
continuing to uncoil said pipe and lower said guide weight as said vessel moves until said guide weight is a predetermined distance above the floor;
maintaining said guide weight at a predetermined distance off the floor and said string adjacent said guide weight at a predetermined angle with the vertical and inclined in the direction that the pipe line is being laid as said vessel moves along the direction in which said pipe line is being laid.

References Cited by the Examiner

UNITED STATES PATENTS

| | | | |
|---|---|---|---|
| 2,910,835 | 11/59 | Timothy | 61—72.3 |
| 2,939,291 | 6/60 | Schurman et al. | 61—46.5 |
| 3,121,954 | 2/64 | Foster | 114—144 |

FOREIGN PATENTS

| | | |
|---|---|---|
| 844,332 | 7/52 | Germany. |
| 601,103 | 4/48 | Great Britain. |
| 885,276 | 12/61 | Great Britain. |
| 94,410 | 6/60 | Netherlands. |
| 128,713 | 1960 | Russia. |

OTHER REFERENCES

Oil and Gas Journal publication, November 4, 1957, pp. 154 and 155.

CHARLES E. O'CONNELL, *Primary Examiner.*

WILLIAM I. MUSHAKE, EARL J. WITMER,
*Examiners*